Inventor
Werner Spingler
Ferdinand Scheu
By Bailey, Stephens & Huettig
Attorneys Aug. 1, 1967    W. SPINGLER ET AL    3,333,830
ELECTRIC HAND MIXER Filed Aug. 4, 1961    4 Sheets-Sheet 3

Inventor
Werner Spingler
Ferdinand Schea
By Bailey Stephens & Huelle
Attorneys

Aug. 1, 1967 W. SPINGLER ET AL 3,333,830
ELECTRIC HAND MIXER
Filed Aug. 4, 1961 4 Sheets-Sheet 4

Inventor
Werner Spingler
Ferdinand Scheu
By
Bailey, Stephens, & Huettig
Attorneys

United States Patent Office 3,333,830
Patented Aug. 1, 1967

3,333,830
ELECTRIC HAND MIXER
Werner Spingler, Schutzenhause 11, Neuffen, Wurttemberg, Germany, and Ferdinand Scheu, Gartenstrasse 19, Beuren, Kreis Nurtingen, Germany
Filed Aug. 4, 1961, Ser. No. 129,471
Claims priority, application Germany, Aug. 13, 1960, E 19,770
13 Claims. (Cl. 259—108)

The present invention relates to a hand mixer which is driven by an electric motor which is enclosed within a housing which also serves as a grip for manipulating the mixer.

There are many different types and designs of electric hand mixers known in the art. They are either equipped with one or several shafts on which different tools may be mounted, and they are usually provided with a more or less cylindrical motor housing. For manipulating these mixers, the motor housings thereof are either provided with laterally projecting or hook-shaped handles, or the cylindrical housings themselves serve as handles or grips.

It is frequently found that the manipulation of such a hand mixer, for example, by means of a laterally projecting handle is not very easy and that, because of the considerable weight of the mixer caused by the electric motor and the off-center position of the handle, such a manipulation leads soon to an excessive tiring of the hand holding the mixer. This is true particularly since such mixers are used primarily in households by women. On the other hand, it has been found that those mixers which are made without a handle and are manipulated by gripping the cylindrical part of the motor housing cannot be safely held. This is due to the large diameter of the housing which is required if the motor has a sufficient power and which is too large to be properly spanned by the hand, and this is further aggravated by the fact that especially when used in the kitchen for the preparation of food, the mixer is often gripped with wet or greasy hands. There is thus always the danger that the mixer will slip out of the hand or at least that, because of the necessary hard gripping of the cylindrical housing, the hand may be overstrained or will in any event become tired very quickly.

It is an object of the present invention to provide an electric hand mixer which overcomes the aforementioned disadvantages of similar known mixers, and which for attaining this object is provided with a motor housing which partly forms a grip portion of a shape which is adapted to the anatomic shape of the hand. This grip portion is therefore provided within a considerable part of its periphery with a curved recess for receiving the thumb and other fingers of the hand holding the mixer, and this recess is designed so that, when the mixer is held by this grip portion, the longitudinal axis of the mixer extends between the thumb and the other fingers. The grip portion is preferably made of such a width that at one side thereof it will accommodate the thumb and at the other side the index and middle fingers of the hand. The smoothly curved recess forming the grip portion preferably extends at both sides thereof transverse to the longitudinal axis of the mixer in such a straight direction that the fingers will rest in the recess almost without bending. At its upper end, the grip portion may also be provided with a lateral projection which will rest on or overlap the part of the hand behind the thumb and index finger. The grip portion is preferably provided on the upper end of the motor housing opposite to the end from which the mixer shaft extends. It is then advisable to utilize the mentioned projection on the upper end of the grip to form the leadin for an electric cable which then extends above the hand holding the mixer without interfering with the manipulation thereof.

Due to the fact that the grip portion of the motor housing has a sharpe which is adapted to the anatomic form of the hand, it is possible to grip the mixer very easily and securely even with a greasy or slippery hand. Since the mixer is practically suspended by its grip portion between the thumb and the other fingers of the hand holding the same, and since it thus rests of its own accord in the hand without slipping and does therefore not require being gripped with great strength the manipulation of the mixer is no longer a tiring procedure. The new grip portion also insures a very secure control of the mixer which is especially of advantage, for example, when preparing food in small or laterally inclined vessels. These advantageous effects are attained without requiring any particular space or material for the grip portion as this is necessary, for example, for the usual grips of such mixers. By providing the leadin of the cable for the motor at a point above the hand holding the mixer, there is no danger that the cable might interfere with the manipulation of the mixer since the cable will then nearly always extend parallel to the forearm of the hand holding the mixer. Since a mixer which is provided with the new grip portion is generally manipulated in a more or less vertical position, it is advisable to provide the upper side of the grip portion with suitable vents which are preferably covered in a suitable manner to prevent the entry of water when cleaning the mixer or of coarse foreign particles.

In order to facilitate the manipulation of the mixer to a still greater extent, it is advisable to mount the electric switch of the mixer on the grip portion in such a manner that it may be easily operated with the fingers of the same hand holding the mixer and without requiring this hand to change its position on the grip. It is thus possible to operate the mixer without any difficulty with only one hand. The switch may therefore be operated with the same hand which holds the mixer and even without requiring the fingers holding it to change their position. The disadvantage is thus avoided which is prevalent in the mixers of prior designs in which the switches are not as easily accessible that the operator rather than being bothered by the difficulty of switching off the mixer, prefers to leave it continuously switched on even though it is not to be used again for a while. This easy accessibility and simple operation of the switch practically results in a temptation to the operator to switch off the mixer when it is not absolutely required—if for no other reason than to stop the buzzing noise of the apparatus. This interruption of the operation of the mixer is of great importance in view of the fact that the motor as well as the bearings of such an apparatus are usually designed only for a short operation and that an operation for an unnecessary length of time will therefore damage the mixer.

Even though the switch of the mixer is designed to be very easily operated when desired, it is, on the other hand, designed and positioned in such a manner that it cannot be accidentally actuated when the mixer is being laid down.

The grip portion of the mixer is hollow at the inside and contains sufficient space to accommodate an antiinterference condenser aside from the switch. It may also be designed to be taken apart so that the switch or the condenser when defective may be easily replaced without requiring the entire mixer to be dis-assembled.

The grip portion at the end of the engine housing may also form an element separate from the remainder of the housing and be removably connected thereto. For this purpose it may be provided at the inside with retaining projections which press the entire assembled drive unit for the mixer shaft against an elastic part at the opposite end of the motor housing and clamp the unit securely within the housing and also lock it against rotation relative to the housing. The drive unit may then be provided at its end facing toward the elastic part in the motor housing with a molded part of insulating material which rests on the elastic part. This design permits the entire mixer to be very easily manufactured. If any repairs are necessary, it is then possible simply to exchange the entire drive unit for another without requiring the individual parts of the mixer to be disassembled or exchanged. Since the mixer shaft is also connected to the drive unit by an elastic coupling of insulating material, the drive unit is mounted in the housing so as to transmit practically no vibrations thereto. This is an advantage of very great importance since, if the connection between the motor housing and the drive unit were made rigid, even small out-of-balance forces which are caused by manufacturing tolerances and cannot be avoided in view of the high speed of the mixer shaft would result in such a strong vibration of the motor housing that the hand of the person holding the mixer would be tired out very soon. However, since according to the invention the drive unit is clamped as a unit between the elastic part in the motor housing, an elastic ring, and the retaining projections in the grip portion, any possible manufacturing tolerances within the motor housing will also be automatically compensated.

The grip portion is preferably connected to the motor housing by screws which extend in the longitudinal direction of the mixer and engage into longitudinal, inwardly projecting ribs on the inside of the wall of the housing. Thus, while in the known mixers the motor housing is generally provided with inwardly projecting eyes into which the screws of the housing cover are screwed to secure this cover to the housing, the mixer according to the invention is provided for the same purpose with continuous ribs. This has the advantage that, especially if the grip portion and the motor housing are made of plastic, the necessary molding tools may be of a simple construction and without requiring complicated cores or the like in the mold.

The easy, secure and untiring manipulation of the hand mixer according to the invention which is attained by the particular shape of its grip portion may be still further improved by providing the motor housing adjacent to the grip portion and at least within the area in which any fingers of the hand holding the mixer on the grip portion reach over the lateral side thereof and upon the cylindrical housing itself with a protection against sliding, for example, in the form of flutes which also further improve the attractive appearance of the entire apparatus.

The aforementioned objects, features, and advantages of the present invention will become more clearly apparent from the following detailed description of one preferred embodiment thereof as illustrated in the accompanying drawings, in which—

FIGURE 6 shows a bottom view of the grip portion of the mixer in the position as shown in FIGURE 1; while

Figure 3:
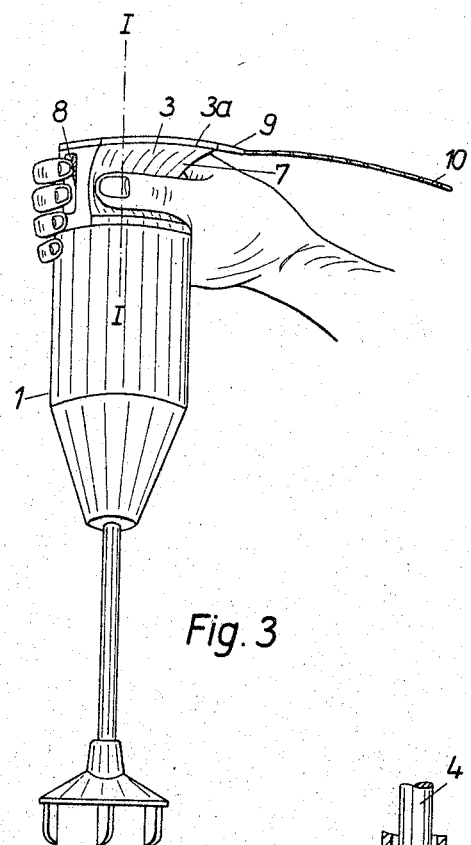
FIGURE 3 shows a reduced perspective view of the mixer while being operated.

Referring to the drawings, the electric hand mixer 1 according to the invention consists of a cylindrical or slightly conical motor housing 2, a grip portion 3 which is connected to housing 2, a mixer shaft 4 which projects from the lower end of housing 2 and is enclosed by a protective tube 5, and a drive unit 6 at the inside of the housing. The grip portion 3 is designed in accordance with the anatomic shape of a hand and is for this purpose provided with a smoothly curved recess 7, one side of which is adapted to receive the thumb, as illustrated in FIGURE 3, while the other side is adapted to receive the index and middle fingers of the hand holding the mixer, so that the longitudinal axis I—I of the mixer extends between the thumb and the other fingers of the hand. The curved recess 7 of the grip portion 3 extends at both sides thereof transverse to the longitudinal axis I—I of the mixer in an almost straight direction so that the fingers can rest therein almost without bending. The grip portion 3 has on its upper end a lateral projection 3a which may rest on or overlap the span between the thumb and the index finger. As illustrated in FIGURE 3, the mixer may thus be securely held with one hand and in a position so that the longitudinal axis I—I of the mixer then extends substantially at a right angle to the hand.

The front side of the grip portion 3 is provided with an electric switch 8 for operating the mixer. This switch 8 is a toggle switch and may therefore be operated with one of the fingers of the hand holding the mixer and even without changing the position of the fingers on the grip portion. The projection 3a on the grip portion which partly overlaps the hand is provided with an opening for the insertion of the electric cable 10 which is covered for a short distance with a flexible sleeve 9 to protect the cable from kinking. As illustrated in FIGURE 3, this sleeve 9 holds the cable end substantially straight over the hand holding the mixer. Aside from switch 8, an anti-interference condenser 11 is also mounted at the inside of the grip portion 3.

Figure 5:
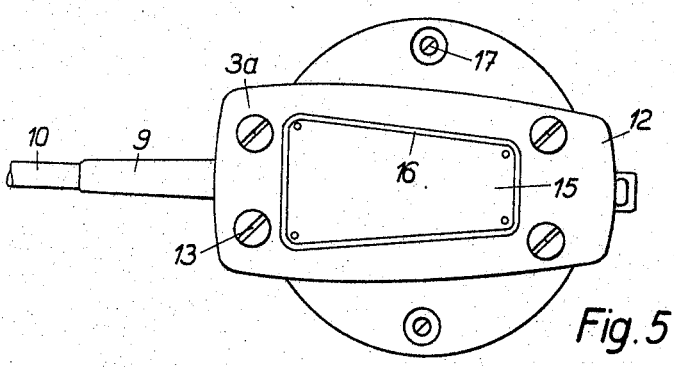
FIGURE 5 shows a plan view of the mixer in the position as shown in FIGURE 1.

Grip portion 3 is adapted to be separated into two parts. Its upper removable cover 12 is connected to the main part of the grip by screws 13 and it is provided with vents 14 which are covered by a plate 15 in such a manner that cooling air may enter the inside of the motor housing through a slot 16 extending completely around plate 15 as shown in FIG. 5. This plate 15 may also be used as a nameplate.

Figure 2:
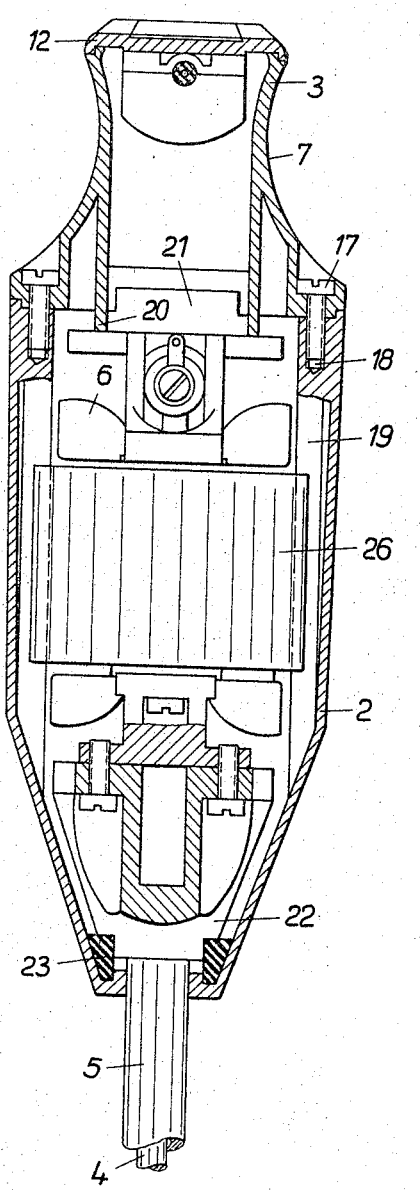
FIGURE 2 shows a central longitudinal section substantially on the line 2—2 of FIGURE 1 of the motor housing and grip portion of the mixer, the section through the lower bearing housing being taken in front of the motor and mixer shafts.

As shown particularly in FIGURE 2 grip 3 is secured to the mixer housing by means of screws 17 which extend in the longitudinal direction of the mixer and are screwed into tapped bores 18 in longitudinal, inwardly projecting ribs 19. In order to permit the motor housing which preferably consists of plastic to be easily produced by means of a simple molding tool, ribs 19 are extended continuously along the inside of the wall of housing 2.

Figure 6:
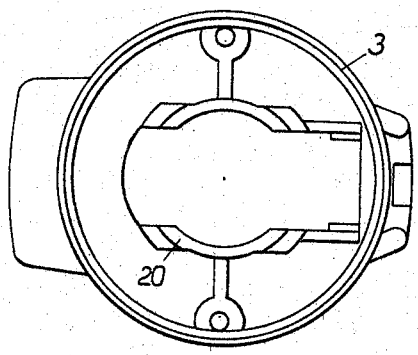
Figure 7:
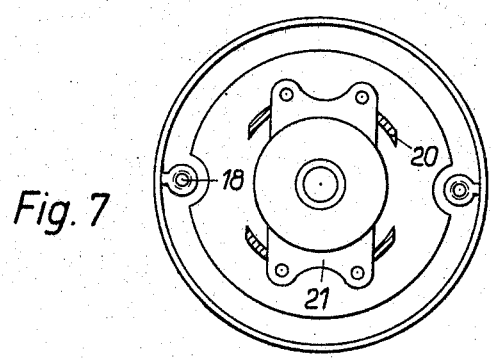
FIGURE 7 shows a plan view of the mixer according to FIGURE 1 after the grip portion is removed, and as seen when turned at a right angle about the axis of FIGURE 6, and with parts of the retaining projections of the grip portion shown in cross section to indicate the position thereof.

Grip 3 is further provided at the inside with downwardly projecting webs 20, as shown in FIGURES 2 and 6, which, when the grip is screwed upon the motor housing 2, act upon the upper bearing housing 21 of the drive unit 6 and press the same downwardly so that a lower molded bearing housing 22 is pressed against an elastic ring 23 which is inserted into the lower end of housing 2. These projecting webs 20 also engage laterally over the upper part 21 of drive unit 6 and thus prevent the drive unit form turning relative to housing 2.

At the inside of the molded bearing housing 22, which is of a tapered shape similar to the shape of the lower end of the motor housing but spaced therefrom and preferably consists of an insulating material, an elastic coupling 24 is provided which connects the end of the mixer shaft 4 with the end of the motor shaft 25. The peripheral surface of the lamination pack 26 of drive unit 6 is provided with longitudinal grooves in a position coinciding with the longitudinal ribs 19 of the housing so that the lamination pack 26 will not engage with these ribs and any transmission of the vibrations of the motor to the housing will thus be avoided.

Figure 1:
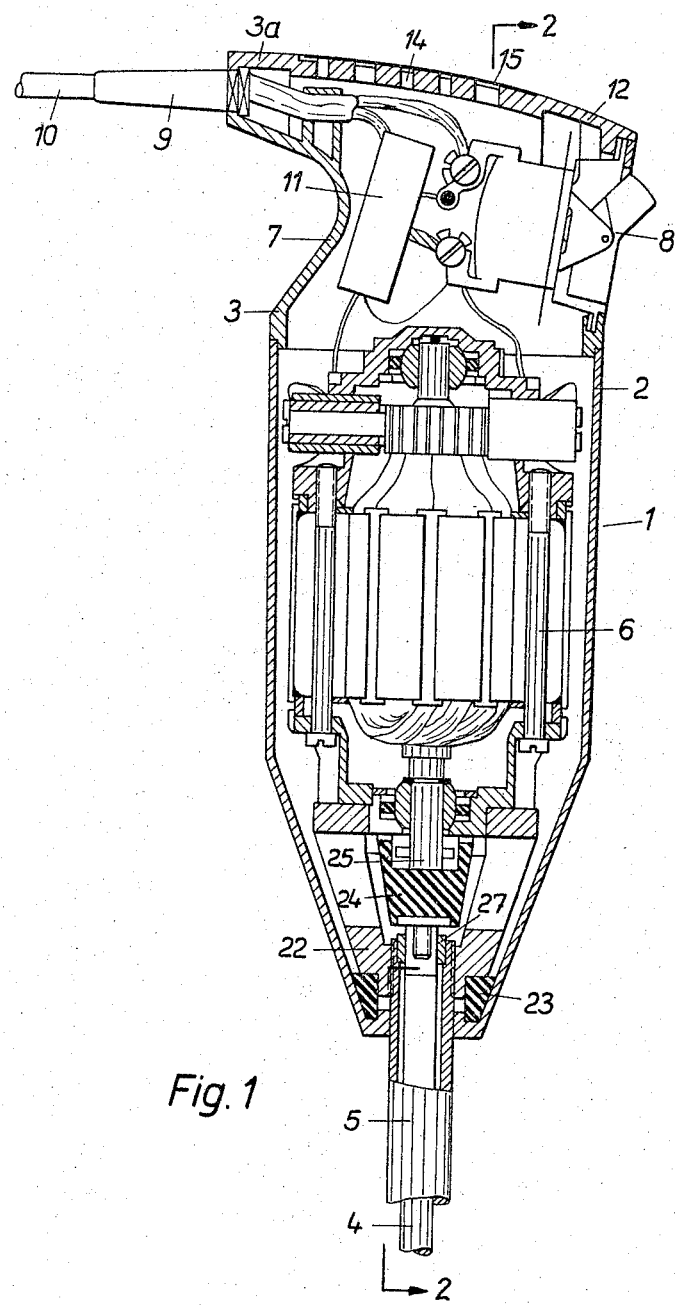
FIGURE 1 shows a central longitudinal section of the electric hand mixer according to the invention, as seen from one side thereof.
Figure 4:
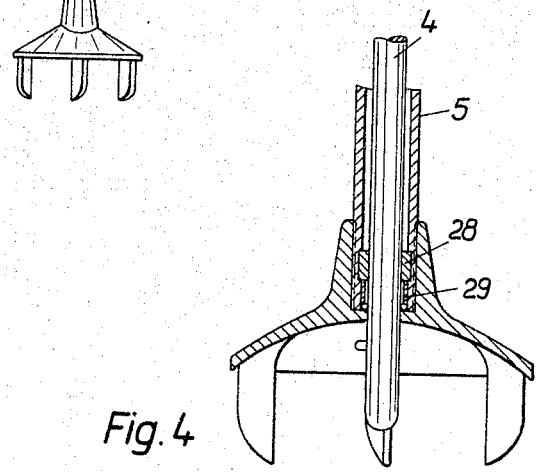
FIGURE 4 shows an enlarged axial section of the lower bearing of the mixer shaft.

The mixer shaft 4 which is connected to the motor shaft 25 by the coupling member 24 is rotatably mounted in bearings 27 and 28, as shown in FIGURES 1 and 4, which are mounted in a fixed protecting tube 5 which is inserted into the lower end of housing 2 and is screwed into bearing housing 22. At the lower end of tube 5, a sealing ring 29 may also be provided to prevent the entry of water or other matter into the space between tube 5 and mixer shaft 4.

Although our invention has been illustrated and described with reference to the preferred embodiment thereof, we wish to have it understood that it is in no way limited to the details of such embodiment, but is capable of numerous modifications within the scope of the apprended claims.

Having thus fully disclosed our invention, what we claim is:

1. In an electric hand mixer having a housing, a motor within said housing, and a grip portion forming a part of and substantially coaxial with said housing and having a shape adapted to the anatomical shape of a person's hand holding the mixer and having grooves at opposite sides thereof extending in a direction transverse to the axis of the motor, said grooves being wide enough to receive at one side the thumb and at the other side another finger of the hand so that the longitudinal axis of the mixer then extends between the thumb and the other fingers of said hand, said housing having a cylindrical portion below said grooves adapted to be engaged by other fingers of the hand.

2. In a mixer as claimed in claim 1, said grip portion having a rigid lateral projection adjacent the grooves adapted to overlap the outer part of the hand behind the thumb and the index finger.

3. In a mixer as claimed in claim 1, in which said grip portion forms a separate element from and removably connected to the upper end of said housing.

4. In a mixer as claimed in claim 1, said grip portion having a rigid lateral projection adjacent the grooves adapted to overlap the outer part of the hand behind the thumb and the index finger, said projection having an opening, a cable extending from the outside through said opening into said grip portion, and means on said projection for holding the part of said cable adjacent to said projection so as to extend over the hand holding the mixer.

5. In a mixer as claimed in claim 1, an electric switch for operating the mixer mounted on said grip portion in a position to be operated by the fingers of the hand holding the mixer without requiring any change in position of said fingers.

6. In a mixer as claimed in claim 1, anti-slip means on said housing at least adjacent to said grip portion within an area overlapped by any fingers of the hand holding the mixer by said grip portion.

7. In a mixer as claimed in claim 1, flutes in the outer surface of said housing at least adjacent to said grip portion serving within the area overlapped by any fingers of the hand holding the mixer by said grip portion to prevent the mixer from sliding within said hand.

8. In a mixer as claimed in claim 1, the radius of curvature of each groove being greater than the width of the grip portion between the bottoms of the grooves.

9. In a mixer as claimed in claim 1, said grip portion at the intersection of a transverse plane through the bottoms of the grooves having a substantially rectangular cross-section.

10. In a mixer as claimed in claim 1, said grip portion at the intersection of a transverse plane through the bottoms of the grooves having a substantially rectangular cross-section of substantially greater length in a direction parallel to the longitudinal axes of the grooves than width in a direction transverse thereto.

11. In an electric hand mixer having a motor housing, a drive unit comprising a motor within said housing, a grip portion forming a separate element from and removably connected to the upper end of said housing and substantially coaxial with said housing, an elastic member within the lower end of said housing, and means on said grip portion at the inside thereof for engaging said drive unit to press it against said elastic member and for engaging laterally over said drive unit to prevent it from turning relative to said housing, said elastic element and said drive unit engaging means constituting the only points of contact between the drive unit and the casing, said grip portion having a shape adapted to the anatomical shape of a person's hand holding the mixer and having grooves at opposite sides thereof extending in a direction transverse to the axis of the motor, said grooves being wide enough to receive at one side the thumb and at the other side another finger of the hand so that the longitudinal axis of the mixer then extends between the thumb and the other fingers of said hand, said housing having a cylindrical portion below said grooves adapted to be engaged by other fingers of the hand.

12. In a mixer as claimed in claim 11, a mixer shaft rotatably mounted within said lower end of said housing, and an elastic coupling connecting said drive shaft and said mixer shaft to each other.

13. In an electric hand mixer having a motor housing, a drive unit within said housing comprising a motor having a drive shaft, a grip portion forming a separate element from and removably connected to the upper end of said housing and substantially coaxial with said housing, means for connecting said drive unit at its opposite ends only to said housing and for resiliently mounting said drive unit in a fixed position within said housing, a mixer shaft, an elastic coupling within said housing connecting said drive shaft and said mixer shaft to each other, a protecting tube secured to the lower end of said housing and enclosing but spaced from said mixer shaft, and bearing means at opposite ends of and within said tube for rotatably mounting said mixer shaft, said grip portion having a shape adapted to the anatomical shape of a person's hand holding the mixer and having grooves at opposite sides thereof extending in a direction transverse to the axis of the motor, said grooves being wide enough to receive at one side the thumb and at the other side another finger of the hand so that the longitudinal axis of the mixer then extends between the thumb and the other fingers of said hand, said housing having a cylindrical portion below said grooves adapted to be engaged by other fingers of the hand.

References Cited

UNITED STATES PATENTS

| 1,397,249 | 11/1921 | Glenn | 310—50 |
| 1,980,651 | 11/1934 | Weimers | 259—135 |
| 2,368,897 | 2/1945 | Strauss et al. | |
| 2,532,823 | 12/1950 | Schumann | 310—50 |
| 2,587,418 | 2/1952 | Wahlberg | 248—26 X |
| 2,696,569 | 12/1954 | Schumann | 310—50 |
| 2,805,050 | 9/1957 | Choppinet | 259—135 |

FOREIGN PATENTS

| 1,117,914 | 3/1956 | France. |
| 1,229,022 | 3/1960 | France. |

WALTER A. SCHEEL, *Primary Examiner.*

JAMES S. SHANK, *Examiner.*

J. M. BELL, *Assistant Examiner.*